United States Patent [19]
Alexander

[11] Patent Number: 5,692,426
[45] Date of Patent: Dec. 2, 1997

US005692426A

[54] FLOATING MITER BOX FOR CUTTING COOPERABLE JOINT PIECES

[76] Inventor: Calvin L. Alexander, P.O. Box 115, Loup City, Nebr. 68853

[21] Appl. No.: 546,636

[22] Filed: Oct. 23, 1995

[51] Int. Cl.$^6$ .................................................. B26D 7/01
[52] U.S. Cl. ........................ 83/466; 83/581; 83/795; 83/809; 269/37; 269/87.2; 269/295
[58] Field of Search .......................... 83/454, 466, 473, 83/581, 809, 762, 795, 810, 820, 821, 829; 269/37, 41, 74, 76, 87.2, 295

[56] References Cited

U.S. PATENT DOCUMENTS

| | | | |
|---|---|---|---|
| 425,051 | 4/1890 | Rowland | 83/454 X |
| 604,291 | 5/1898 | Bailey | 83/466 X |
| 637,902 | 11/1899 | Spery | 269/87.2 X |
| 789,357 | 5/1905 | Collings | 269/87.2 |
| 3,057,240 | 10/1962 | DeWitt | 83/581 X |
| 3,129,623 | 4/1964 | Lowell | 83/466 X |
| 3,171,453 | 3/1965 | Brownrigg | 83/762 |
| 3,881,385 | 5/1975 | Coy | 83/466 X |
| 3,935,779 | 2/1976 | Hildebrandt et al. | 83/762 |
| 4,300,755 | 11/1981 | Potvin | 269/295 X |
| 4,461,196 | 7/1984 | Schramm, II | 83/581 X |
| 4,986,154 | 1/1991 | Vernacchio | 83/454 X |

*Primary Examiner*—Rinaldi I. Rada
*Assistant Examiner*—Clark F. Dexter
*Attorney, Agent, or Firm*—Zarley, McKee, Thomte, Voorhees & Sease; Mark D. Frederiksen

[57] ABSTRACT

A miter box assembly includes a miter box having a flat base and upwardly projecting side walls with slots in the side walls for receiving a saw blade. The miter box includes a forwardly projecting flange with a first aperture therethrough and a rearwardly projecting flange with a second aperture therethrough, the first and second apertures aligned along a central longitudinal axis of the box. A pin depends from the bottom of the box and is located along the longitudinal axis of the box and preferably spaced farther from the first aperture than from the second aperture. A base plate having first and second perpendicular axes ascribed on the upper surface thereof includes a plurality of pivot apertures aligned along the second axis for pivotally receiving the pivot pin on the bottom of the miter box. Securement apertures are located on the upper surface of the base plate a distance from one of the pivot apertures which is equal either to the distance between the pivot pin and the first miter box aperture or the pivot pin in the second miter box aperture such that pivotal movement of the miter box on a pivot pin within a pivot aperture will align either the first or second apertures in the miter box with a securement aperture.

7 Claims, 8 Drawing Sheets

5,692,426

FLOATING MITER BOX FOR CUTTING COOPERABLE JOINT PIECES

TECHNICAL FIELD

The present invention relates generally to a method for cutting pipe, channel, and the like to form elbows, "Ts" and other fittings, and more particularly to an improved method for cutting cooperable joint pieces utilizing a movable miter box which cooperates with a base plate for appropriate orientation.

BACKGROUND OF THE INVENTION

One of the most time consuming jobs in manufacturing and installing irrigation pipe is the need to form joints of various types, including 45° and 90° elbows, end Ys, and line Ts. While such joints, and the fittings necessary to create the joints, are known in the prior art, the method utilized to create the joints is extremely labor intensive, and calls for the customized creation of each joint utilizing templates attached directly to the pipe. In addition, prior art methods call for the alignment of templates on separate pieces in order to form cooperable joint pieces. While in theory the procedure creates joint fittings without difficulty, in practical application the alignment of separate components and templates on the components is quite difficult. For this reason, it is common to cut a single joint component a number of times before the fitting will create the required joint.

SUMMARY OF THE INVENTION

It is therefore a general object of the present invention to provide an improved method for cutting fitting components which cooperate to form a joint end pipe, channel, or other stock.

Another object is to provide a method for cutting cooperable joint components which does not require movement of the stock within the miter box.

Still another object of the present invention is to provide a method for cutting cooperable joint components which quickly and accurately creates the joint components with little waste product.

Still a further object is to provide a method for cutting joint components which creates identical components which may thereby be interconnected with other standard components to form joints.

Yet another object of the present invention is to provide an improved miter box assembly.

Still another object of the present invention is to provide a miter box assembly which permits cutting of cooperable joint components without adjustment of stock within the miter box.

Still a further object is to provide a miter box assembly which is simple to use, and economical to manufacture.

These and other objects will be apparent to those skilled in the art.

The miter box assembly of the present invention includes a miter box having a flat base and upwardly projecting side walls with slots in the side walls for receiving a saw blade. The miter box includes a forwardly projecting flange with a first aperture therethrough and a rearwardly projecting flange with a second aperture therethrough, the first and second apertures aligned along a central longitudinal axis of the box. A pin depends from the bottom of the box and is located along the longitudinal axis of the box and preferably spaced farther from the first aperture than from the second aperture. A base plate having first and second perpendicular apertures ascribed on the upper surface thereof includes a plurality of pivot apertures aligned along the second axis for pivotally receiving the pivot pin on the bottom of the miter box. Securement apertures are located on the upper surface of the base plate a distance from one of the pivot apertures which is equal either to the distance between the pivot pin and the first miter box aperture or the pivot pin in the second miter box aperture such that pivotal movement of the miter box on a pivot pin within a pivot aperture will align either the first or second apertures in the miter box with a securement aperture.

DESCRIPTION OF THE PREFERRED EMBODIMENT

Figure 1:
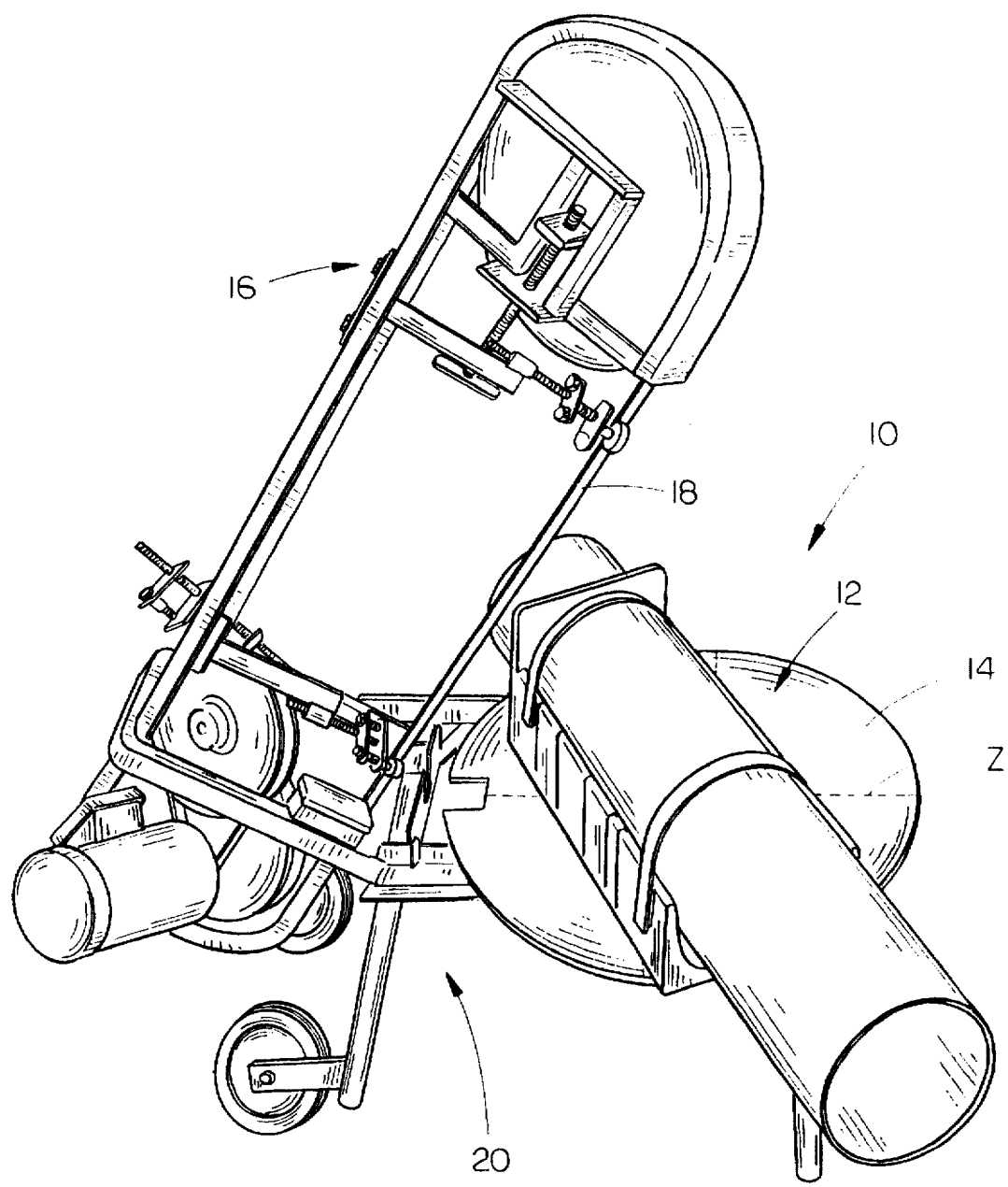
FIG. 1 is a perspective view of the miter box assembly of the present invention installed on a bandsaw, as utilized with the method of the invention.

Referring now to the drawings, in which similar or corresponding parts are identified with the same reference numeral and more particularly to FIG. 1, the miter box assembly of the present invention is designated generally at 10 and includes a "floating" miter box 12 which is selectively and removably secured to a generally circular base or base plate 14.

Miter box assembly 10 may be attached to any conventional bandsaw 16 with the saw blade 18 operably mounted so as to pivot within a vertical plane passing through a transverse axis $Z_1$ marked on the upper surface of base 14.

Figure 2:
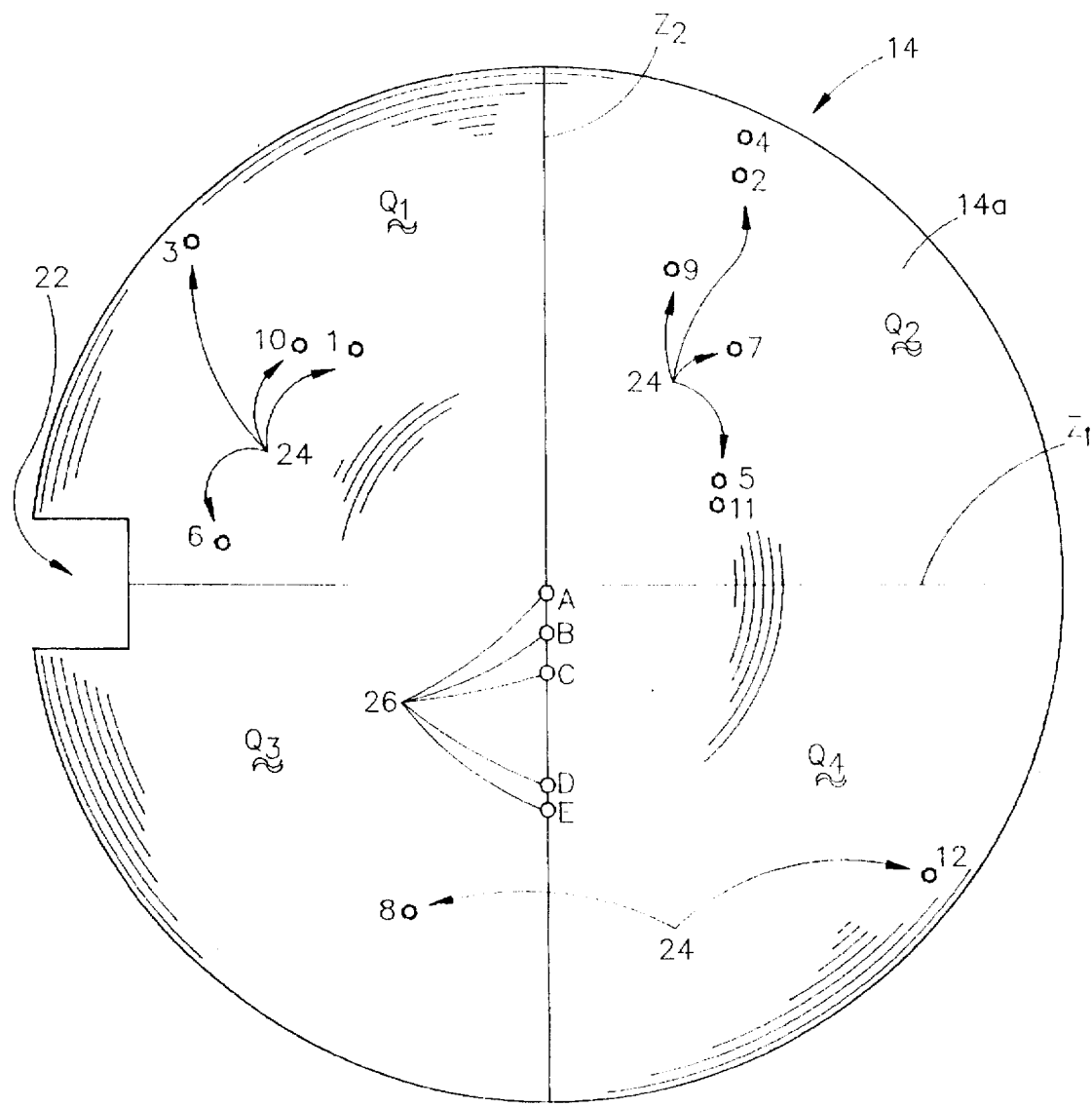
FIG. 2 is a plan view of the base of the miter box assembly.

Referring now to FIG. 2, base 14 is preferably circular in shape, with a transverse axis $Z_1$ ascribed thereon and a second axis $Z_2$ perpendicular to the first axis $Z_1$ with axes $Z_1$ $Z_2$ crossing at the center of base 14. A notch 22 is formed in one edge of base 14 generally centered at the end of axis $Z_1$, to provide clearance for the bandsaw blade (as shown in FIG. 1). Axes $Z_1$ and $Z_2$ divide base 14 into four quadrants $Q_1$, $Q_2$, $Q_3$ and $Q_4$, respectively. Threaded apertures 24 are formed vertically downwardly in the upper surface 14a of base 14 and arranged within quadrants $Q_1$–$Q_4$ spaced predetermined distances from axes $Z_1$ and $Z_2$, for a purpose described in more detail hereinbelow. For purposes of description, threaded apertures 24 have been numbered 1–12, for ease of description.

In addition to threaded apertures 24, a plurality of unthreaded pivot apertures 26 are provided. Apertures 26 are identified by letters A, B, C, D and E, and are centered along the $Z_2$ axis and spaced a predetermined distance away from the $Z_1$ axis, as described hereinbelow.

Figure 3:
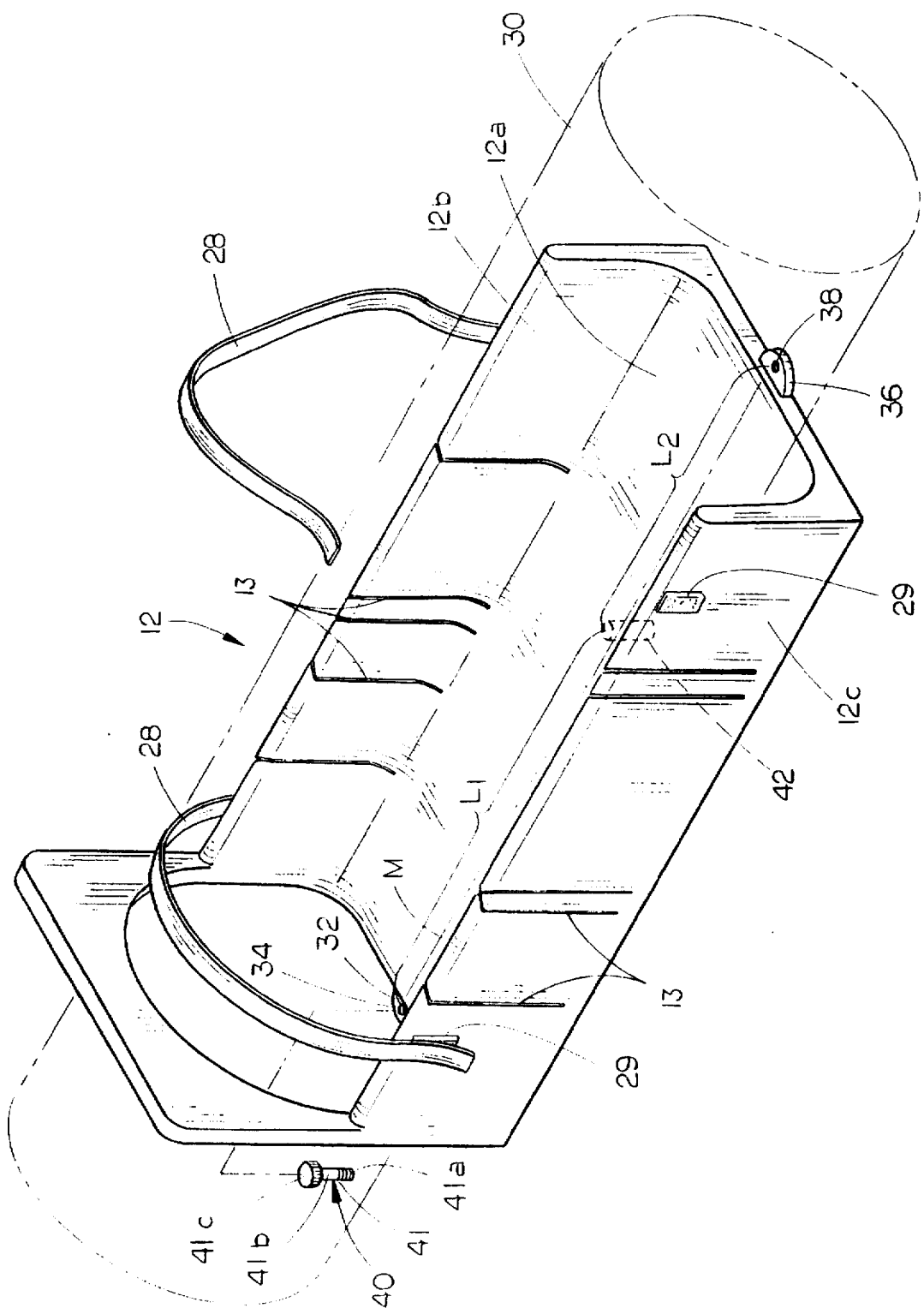
FIG. 3 is a perspective view of the miter box of the miter box assembly.

Referring now to FIG. 3, miter box 12 is shown in more detail. Miter box 12 is a conventional channel shaped member having a flat base portion 12a with side walls 12b and 12c projecting upwardly along the longitudinal side edges of the miter box base 12a. Each side wall 12b and 12c has a plurality of slots 13 therein, each slot in side wall 12b being aligned with a slot in side wall 12c. A pair of straps 28 have the hook portion of hook and loop fasteners attached on the opposing ends thereof to permit removable securement to pads 29 on side walls 12b and 12c having the loop portion of the hook and loop fastener thereon. Straps 28 may be utilized to secure a pipe section, shown in hidden lines at 30, or other stock within miter box 12.

A flange 32 projects forwardly from a forward end of base portion 12a of miter box 12, and has an aperture 34 formed therethrough. Aperture 34 is located along the longitudinal axis M of miter box 12. A second flange 36 projects rearwardly from a rearward end of miter box 12 and has an aperture 38 therethrough which is also located along axis M of miter box 12. A securement bolt 40 is provided for securing either the forward or rearward end of miter box 12 in position at one of threaded apertures 24 on base plate 14. Bolt 40 includes a shank 41 having a threaded lower end 41a and unthreaded upper end 41b, with a knurled head 41c. The diameter of apertures 34 and 38 is large enough to receive the unthreaded portion 41b of bolt shank 41 to permit free rotation within apertures 34 and 38. The threaded portion 41a of shank 41 is threaded for engagement with any one of threaded apertures 24. Knurled head 41c permits tightening of bolt 40 into the desired securement aperture 24.

A pivot pin 42 is mounted to the bottom surface of base portion 12a of miter box 12 and is located axis M. Preferably, pin 42 is located a distance $L_1$ from forward aperture 34, and is located a distance $L_2$ from rearward aperture 38, distance $L_1$ being greater than distance $L_2$.

Figure 4:
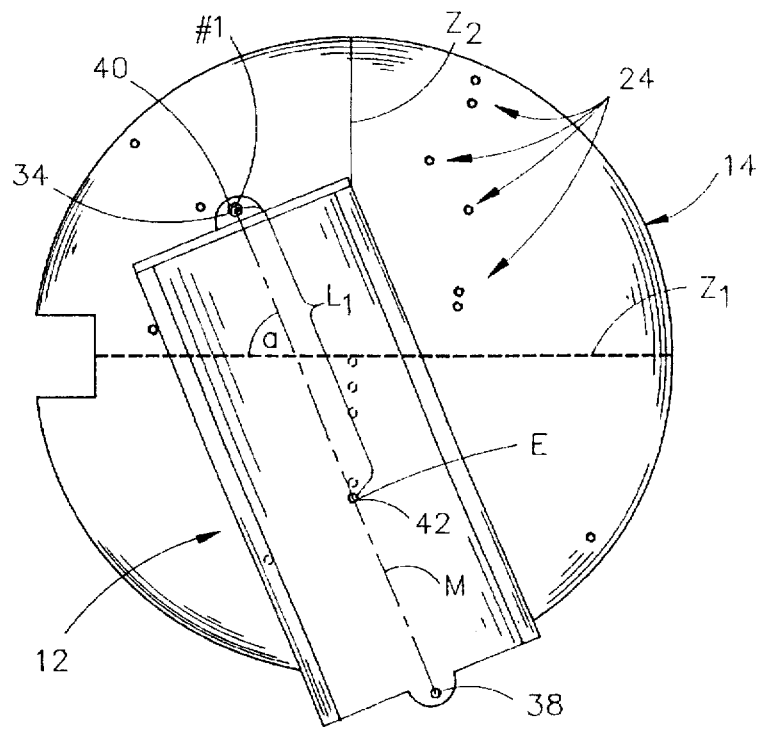
FIG. 4 is a plan view of the miter box assembly with the miter box located for a first cut of the method of the invention.
Figure 5:
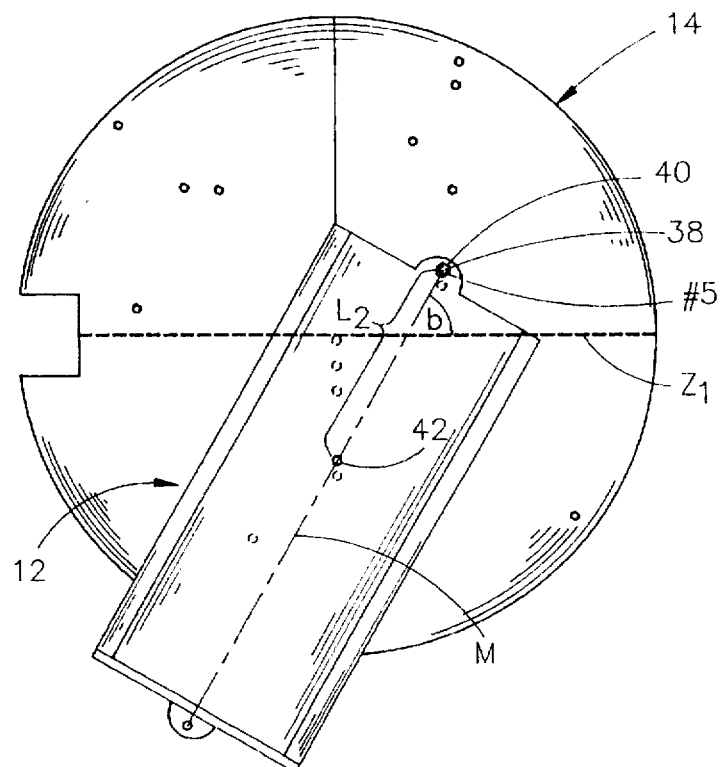
FIG. 5 is a plan view of the miter box assembly with the miter box oriented in a second position for a second cut.

Referring now to FIGS. 4 and 5, it can be seen that miter box 12 may be positioned in a wide variety of orientations on base plate 14 such that miter box axis M intersects base plate axis $Z_1$ at a predetermined angle designated as alpha (a) in FIG. 4 and designated as beta (b) in FIG. 5, and at a predetermined location along distance $L_1$ in FIG. 4 or $L_2$ in FIG. 5. The particular locations of threaded apertures 24 and pivot apertures 26, shown in FIG. 2, are predetermined so as to permit the cutting of cooperable joint components in 6 inch, 8 inch, 10 inch and 12 inch irrigation pipe. The locations of threaded apertures 24 in quadrants $Q_1$–$Q_4$, as well as pivot apertures 26 along axis $Z_2$, may be relocated as desired for other angles and lengths of cuts in various types of stock.

Figure 8:
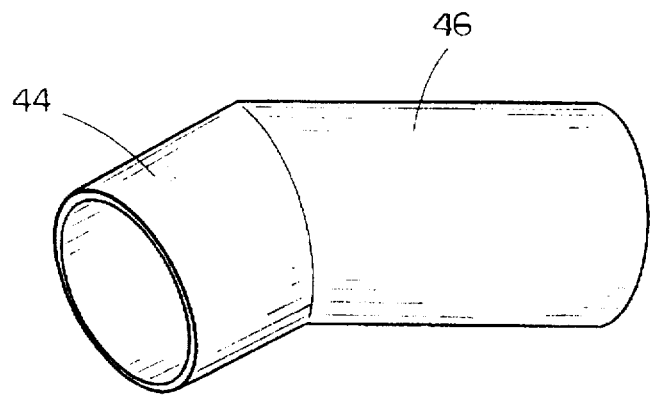
FIG. 8 is a 45° elbow joint formed of cooperable joint components cut utilizing the apparatus and method of the present invention.
Figure 9:
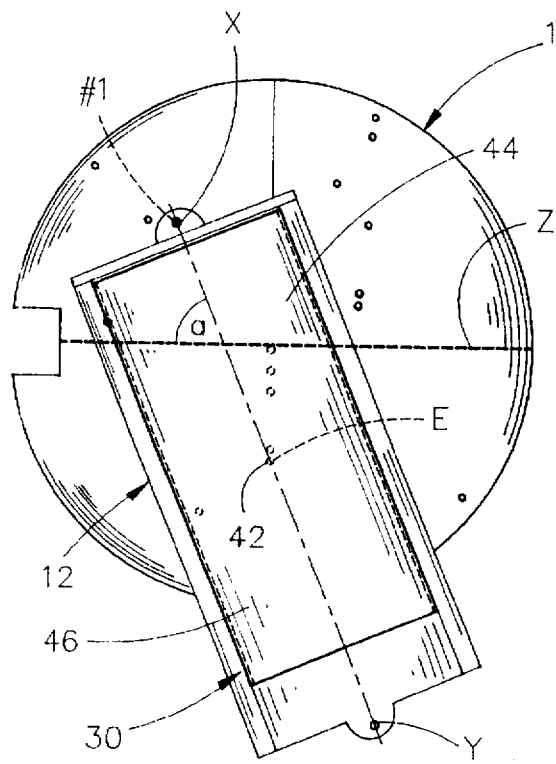
FIG. 9 is a top plan view showing the first cut of a pipe section to form the components of a 90° elbow.

For clarity in defining the apparatus and method of the present invention, the procedures for manufacturing the joint components for the joints shown in FIGS. 6, 7 and 8, will be described in more detail. For ease of description, threaded apertures 24 will be referred to by the designated aperture number (numbers 1–12), pivot apertures 26 will be referred to by the designed letter (letters A–E), forward flange aperture 34 will be referred to as "X" and rearward flange aperture 38 will be referred to as "Y". Referring now to FIG. 9, a length of pipe 30 is inserted within miter box 12 and secured into position. Miter box 12 is then located on base plate 14 with pivot pin 42 journaled in pivot aperture E, and flange aperture X secured in alignment with threaded aperture #1. All cuts are made along base plate axis $Z_1$, and therefore furthest reference to a cut should be construed as a cut along the $Z_1$ axis. After completion of the first cut, first and second joint components 44 and 46 are formed from pipe section 30. Pipe section 30 is cut an angle a of 22½° such that reorienting components 44 and 46, as shown in FIG. 8 will form a 45° elbow joint.

Figure 6:
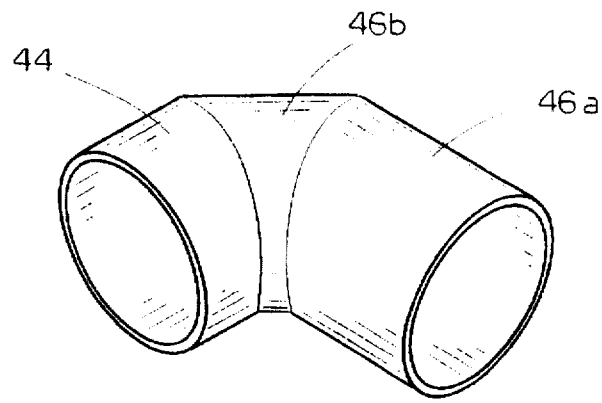
FIG. 6 is a perspective view of a 90° elbow formed with cooperable joint components cut with the apparatus and method of the present invention.
Figure 10:
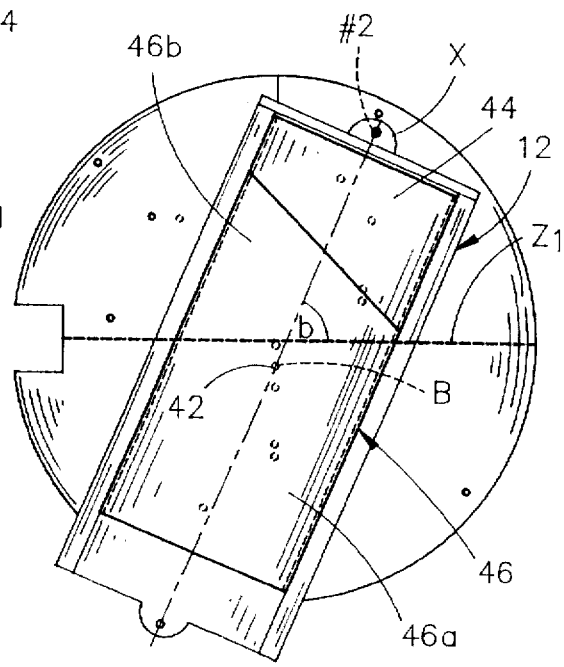
FIG. 10 is a top plan view of the miter box assembly with the pipe section of FIG. 9, oriented to form the second cut to form the components of a 90° elbow assembly.
Figure 11:
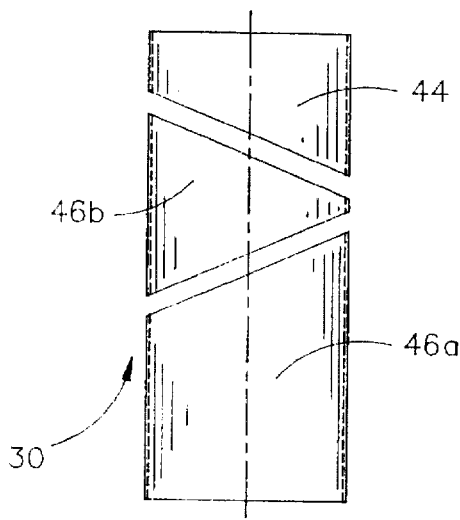
FIG. 11 is a plan view showing the three cooperable joint components formed with the method described in FIGS. 9 and 10.
Figure 12:
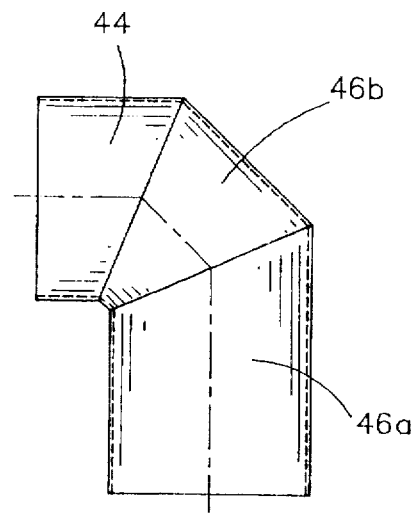
FIG. 12 shows a 90° elbow utilizing the components shown in FIG. 11.

In order to construct a 90° elbow joint, shown in FIGS. 6 and 12, a second cut is made after the first cut shown in FIG. 9. Referring to FIG. 10, miter box 12 is reoriented with pivot pin 42 located in pivot aperture B and with the X flange aperture aligned with and secured to threaded aperture #2. A second cut is made second cut is made along axis $Z_1$ so as to cut joint component 46 into individual components 46a and 46b. FIG. 11 shows pipe section 30 after completion of the two cuts, forming joint components 44, 46a and 46b with no waste material upon completion of the cuts. Rotation of the joint components along their longitudinal axes permits configuration of the components into a 90° elbow as shown in FIGS. 6 and 12. Connection of the joint components may be by any known method, including welding for metal components, and adhesive affixation for plastic components.

Figure 7:
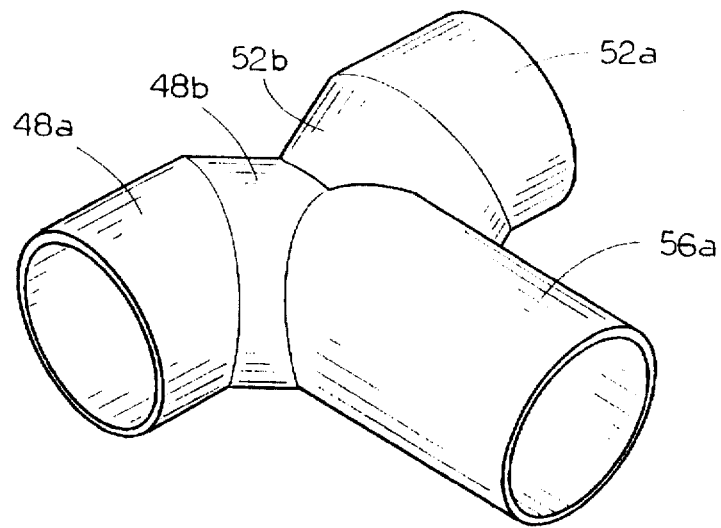
FIG. 7 is an end Y joint formed of cooperable joint components cut using the method and apparatus of the present invention.

Referring now to FIGS. 13–21, an end Y joint, as shown in FIG. 7, may be constructed utilizing the miter box assembly 10 and the method of the present invention. Initially, the arms of the Y are constructed, each arm utilizing an identical method and three individual cuts of a pipe section 48.

Figure 13:
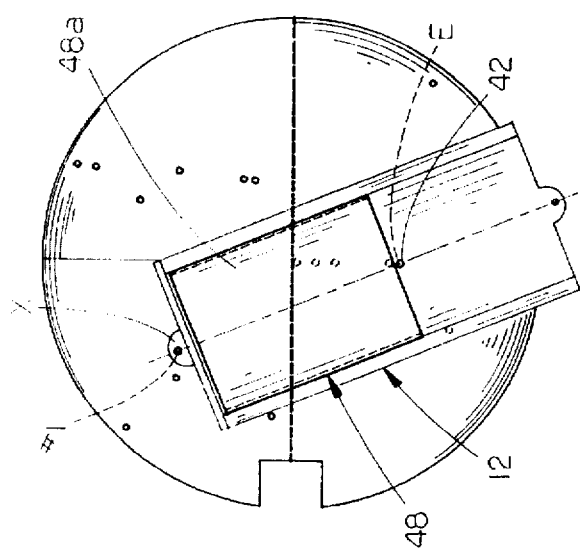
FIG. 13 is a plan view of the miter box assembly showing a first cut of a pipe section to form one arm of an end Y joint.

Referring to FIG. 13, miter box 12 is oriented with pivot pin 42 journaled in pivot aperture E and flange aperture X aligned with threaded aperture #1. The first cut thereby divides pipe section 48 into joint components 48a and 48b. Miter box 12 is then repositioned with pivot pin 42 journaled in pivot aperture a and flange aperture X aligned with threaded aperture #3. The second cut divides joint component 48b to form edge 50a and a waste component 48c.

Figure 15:
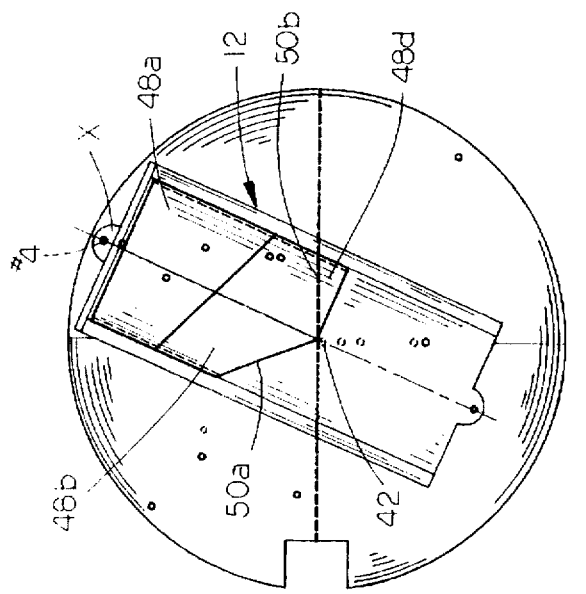
FIG. 15 is a plan view of the miter box assembly oriented for a third cut to form one arm of an end Y joint.
Figure 14:
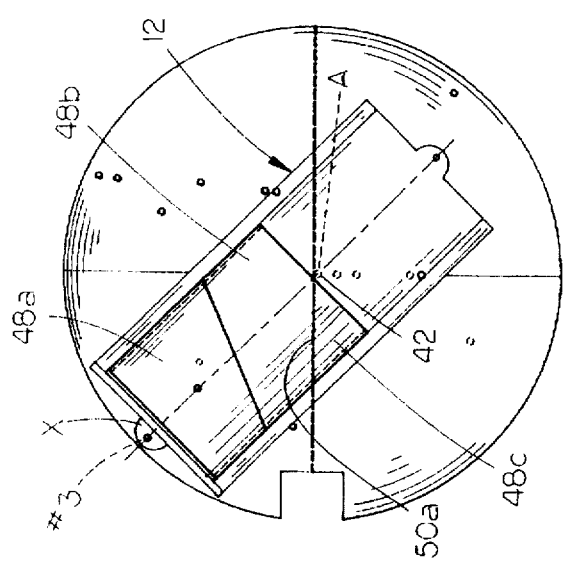
FIG. 14 is a plan view of the miter box assembly with the miter box oriented for a second cut of a pipe section for one arm of an end Y.
Figure 16:
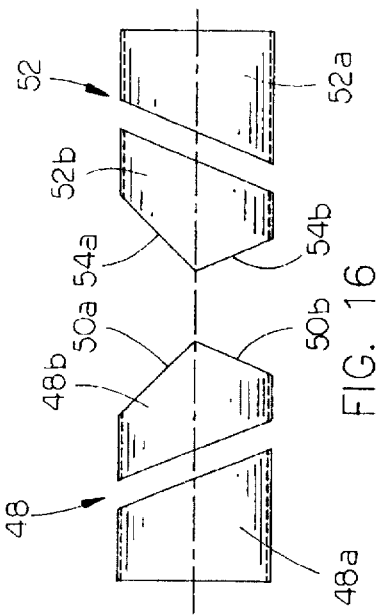
FIG. 16 is a plan view of the components formed from the method described in FIGS. 13–15 to form the arms of an end Y joint.

Referring now to FIG. 15, miter box 12 is pivoted on pin 42 to position flange aperture X in alignment with threaded aperture #4. A third cut forms a second angled edge 50b on joint component 48b and forms a second waste component 48d. As shown in FIG. 16, pipe section 48 results in the two joint components 48a and 48b shown in the drawing. The same steps are taken with a second pipe section 52 to form joint components 52a and 52b with angled edges 54a and 54b on one end of joint component 52b.

Figures 17, 18:
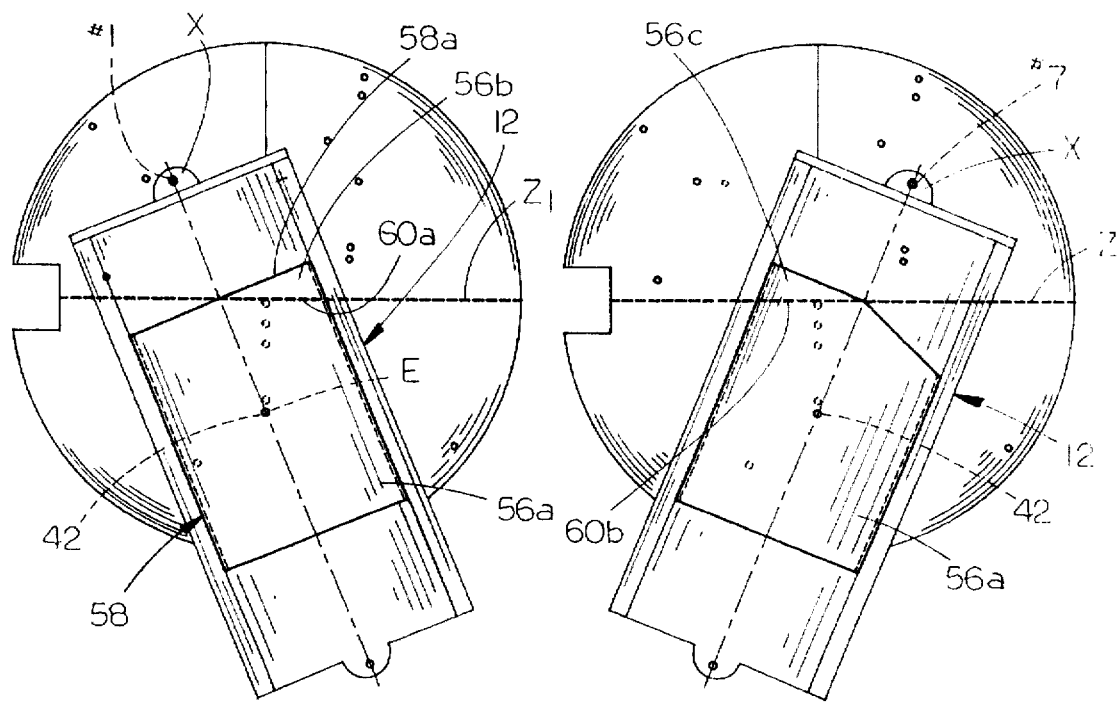
FIG. 17 is a plan view of the miter box assembly with a pipe section therein and oriented to form the first cut to form the stub section of an end Y joint.
FIG. 18 is a plan view of the miter box assembly with the miter box oriented for a second cut to form the stub section of an end Y joint.
Figure 19:
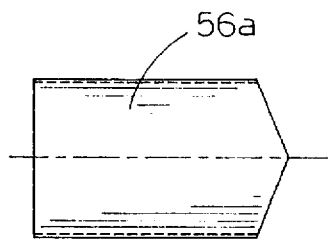
FIG. 19 is a plan view of the pipe section formed by making the cuts shown in FIGS. 17 and 18.
Figure 20:
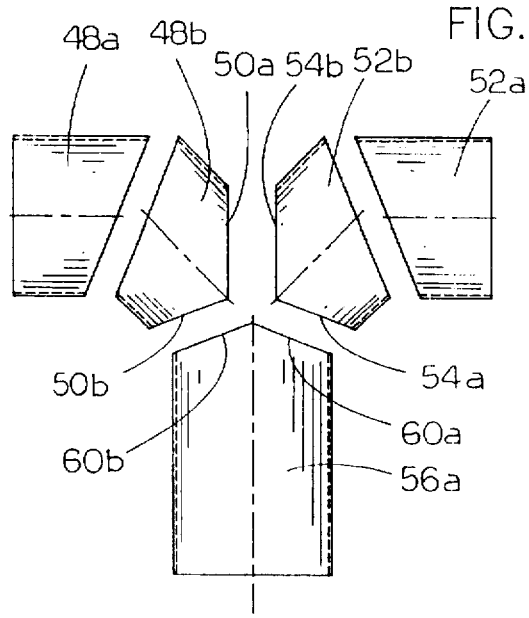
FIG. 20 is a plan view of the five components cut using the method described in FIGS. 13–15 and 17–18 to form an end Y joint.
Figure 21:
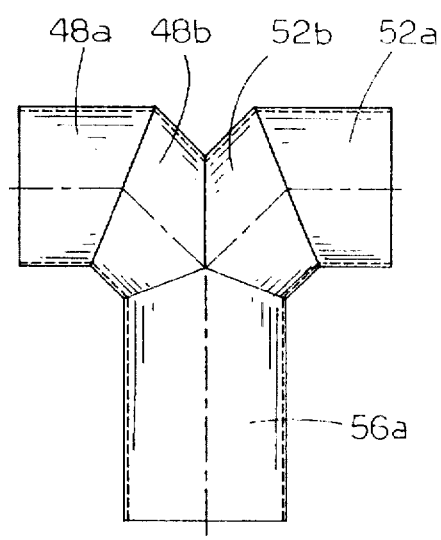
FIG. 21 is a plan view of an end Y joint with the five cooperable joint components cuts utilizing the method of the present invention.

As shown in FIGS. 20 and 21, joint components 48a, 48b, 52a and 52b form the arms of the end Y joint. The stub section 56a is formed using the steps shown in FIGS. 17 and 18. Referring to FIG. 17, pipe section 58 is inserted in miter box 12. Miter box 12 is oriented with pivot pin 42 journaled in pivot aperture E, and flange aperture X aligned with threaded aperture #1. Pipe section 58 is located such that the cutting axis $Z_1$ passes through the center of the forward edge 58a of pipe section 58. The first cut thereby forms joint component 56a and a waste component 56b along cut line 60a. Miter box 12 is then pivoted on pivot pin 42 to align flange aperture X with threaded aperture #7. A second cut will produce the finished joint component 56a and a second waste component 56c along cut line 60b.

Referring to FIG. 20, the five components 48a, 48b, 52a, 52b and 56a are oriented to form an end Y joint. It can be seen that edge 50a of joint component 48b aligns with edge 54b of joint component 52b to produce the diverging portion of the arms of the Y. Joint components 48a and 52a form the final part of the diverging joint to direct fluid at 90° angles to the axis of joint component 56a.

The edge cut 60a and 60b then align with edges 54a of joint component 52b, and edge 50b of joint component 48b so as to interconnect the stub section 56a with the arms of the end Y. The resulting Y shown in FIGS. 21 and 7 is the result of interconnection of five standardized components which may be cut at any time and stocked for future use. The method of the present invention and the miter box assembly of the present invention permit confidence that every joint component of every desired joint will be identical. Thus, the method and apparatus of the present invention eliminates the vast majority of prior art labor intensive customized fitting cuts.

Whereas the invention has been shown and described in connection with the preferred embodiment thereof, many modifications, substitutions and additions may be made which are within the intended broad scope of the appended claims. For example, other angles for elbows, end Ys, line Ts, and any other desired joint may be simply and easily cut by locating appropriate pivot apertures and threaded apertures on the base plate 14 of the miter box assembly. In addition, the method and apparatus can be utilized on other forms of stock, such as channel, tube, conduit, angle iron, and many other varied applications.

I claim:

1. A miter box assembly, comprising:

a miter box having a generally flat base portion with forward and rearward ends and opposing longitudinal sides, and opposing parallel side walls projecting upwardly from the sides of the base portion;

said miter box side walls having a plurality of vertical slots formed therein extending downwardly from upper edges of the side walls, each slot in one side wall being aligned with one of the slots in the opposing side wall, to permit passage of a saw blade downwardly through both side walls;

said miter box forward end having a first aperture formed therethrough, said first aperture located along a longitudinal central axis of the miter box;

a pivot pin fixed to the base portion and depending from a bottom surface of the base portion and located along the longitudinal central axis of the box, said pin located a first predetermined distance from the first aperture;

a base plate having an upper surface supporting the miter box;

said base plate having a first pivot aperture formed in the upper surface thereof pivotally receiving the miter box pivot pin; and said base plate having a first securement aperture formed in the upper surface thereof for selectively receiving a removable fastener; wherein said removable fastener is removably journaled through said miter box first aperture and into said securement aperture to selectively secure said miter box in a predetermined position on the base plate.

2. The miter box assembly of claim 1, wherein said miter box rearward end includes a second aperture formed therethrough and located along the longitudinal central axis of the box;

said pivot pin located between the first and second apertures;

whereby said fastener can be removed from said first aperture and removably journaled through said second aperture and into said securement aperture to selectively secure said miter box in another predetermined position on the base plate.

3. The miter box assembly of claim 2, wherein said base plate includes a second securement aperture formed in the upper surface thereof for selectively receiving said fastener.

4. The miter box assembly of claim 3, wherein said pivot pin is located a second distance from the second aperture;
wherein the first and second distances are unequal;
wherein the first securement aperture is spaced from the first pivot aperture a length equal to the first distance; and
wherein the second securement aperture is spaced from the first pivot aperture a length equal to the second distance.

5. The miter box assembly of claim 1, wherein said base plate includes a second securement aperture formed in the upper surface thereof for selectively receiving said fastener.

6. The miter box assembly of claim 1, further comprising a second pivot aperture formed in the upper surface of the base plate for pivotally receiving the miter box pivot pin; and further comprising a second securement aperture formed in the upper surface of the base plate for receiving the fastener therein and spaced from the first securement aperture, the distance between the first pivot aperture and the first securement aperture being equal to the distance between the second pivot aperture and the second securement aperture.

7. The miter box assembly of claim 6, wherein said base plate includes first and second perpendicular axes intersecting at a center point of the base plate, and wherein said first and second pivot apertures are located along the second axis between the first axis and an edge of the base plate.

* * * * *